(12) United States Patent
Wang

(10) Patent No.: US 9,567,681 B2
(45) Date of Patent: Feb. 14, 2017

(54) CORROSION RESISTANT AND ELECTRICALLY CONDUCTIVE SURFACE OF METALLIC COMPONENTS FOR ELECTROLYZERS

(71) Applicant: TREADSTONE TECHNOLOGIES, INC., Princeton, NJ (US)

(72) Inventor: Conghua Wang, West Windsor, NJ (US)

(73) Assignee: TREADSTONE TECHNOLOGIES, INC., Princeton, NJ (US)

( * ) Notice: Subject to any disclaimer, the term of this patent is extended or adjusted under 35 U.S.C. 154(b) by 0 days.

(21) Appl. No.: 13/931,393

(22) Filed: Jun. 28, 2013

(65) Prior Publication Data

US 2014/0224650 A1    Aug. 14, 2014

Related U.S. Application Data

(60) Provisional application No. 61/776,189, filed on Mar. 11, 2013, provisional application No. 61/763,648, filed on Feb. 12, 2013.

(51) Int. Cl.
*B32B 15/00* (2006.01)
*C25B 11/04* (2006.01)
(Continued)

(52) U.S. Cl.
CPC ............ *C25B 11/0494* (2013.01); *C25B 1/08* (2013.01); *C25B 9/20* (2013.01); *C25B 11/04* (2013.01);
(Continued)

(58) Field of Classification Search
USPC ........................................ 429/414, 457, 518
See application file for complete search history.

(56) References Cited

U.S. PATENT DOCUMENTS

| | | |
|---|---|---|
| 3,755,105 A | 8/1973 | Messner |
| 4,104,785 A | 8/1978 | Shiba |

(Continued)

FOREIGN PATENT DOCUMENTS

| | | |
|---|---|---|
| CH | 533 691 | 2/1973 |
| CN | 102074715 B | 7/2015 |

(Continued)

OTHER PUBLICATIONS

A.S. Woodman et al., "Development of Corrosion-Resistant Coatings for Fuel Cell Bipolar Plates", American Electroplaters and Surface Finishers Society, AESF SUR/FIN '99 Prooceedings, Jun. 21-24, 1999.

(Continued)

*Primary Examiner* — Daniel J Schleis
(74) *Attorney, Agent, or Firm* — DLA Piper LLP (US)

(57) ABSTRACT

Methods for providing a metal surface structure and treatment process to prevent the corrosion (e.g., high electrochemical potential oxidization and hydrogen embrittlement) of a metallic component used in electrolyzer operational conditions. The oxide surface scale of a metal plate is used to prevent the corrosion, and electrical conductive materials such as e.g., precious metals or carbon are used to provide the surface electrical conductance of the metallic components. The methods advantageously produce, at a low cost, metal components for electrolyzers that need high electrical conductance and corrosion resistance for long term operation.

11 Claims, 9 Drawing Sheets

(51) Int. Cl.
*C25B 1/08* (2006.01)
*C25B 9/20* (2006.01)

(52) U.S. Cl.
CPC .......... *C25B 11/0484* (2013.01); *Y02E 60/366* (2013.01)

(56) References Cited

U.S. PATENT DOCUMENTS

| | | |
|---|---|---|
| 4,310,404 A | 1/1982 | Satoh |
| 4,666,743 A | 5/1987 | Ohta et al. |
| 4,706,870 A | 11/1987 | Legge |
| 5,098,485 A | 3/1992 | Evans |
| 5,397,657 A | 3/1995 | Ito et al. |
| 5,624,769 A | 4/1997 | Li et al. |
| 5,682,067 A | 10/1997 | Manley et al. |
| 6,245,390 B1 | 6/2001 | Baranovski et al. |
| 6,258,243 B1 | 7/2001 | Heimann et al. |
| 6,372,376 B1 | 4/2002 | Fronk et al. |
| 6,379,476 B1 | 4/2002 | Tarutani et al. |
| 6,425,745 B1 | 7/2002 | Lavin |
| 6,455,108 B1 | 9/2002 | Muffoletto et al. |
| 6,475,958 B1 | 11/2002 | Paul |
| 6,649,031 B1 | 11/2003 | Iqbal et al. |
| 6,685,988 B2 | 2/2004 | Van Steenkiste et al. |
| 6,728,092 B2 | 4/2004 | Hunt et al. |
| 6,761,990 B1 | 7/2004 | Yoshitake |
| 6,919,543 B2 | 7/2005 | Abbott |
| 6,924,002 B2 | 8/2005 | Lee et al. |
| 7,052,741 B2 | 5/2006 | Medeiros et al. |
| 7,070,833 B2 | 7/2006 | Smith et al. |
| 7,144,648 B2 | 12/2006 | Tawfik et al. |
| 7,309,540 B2 | 12/2007 | Wang |
| 7,399,532 B2 | 7/2008 | Seido et al. |
| 7,758,921 B2 * | 7/2010 | Liu et al. .................. 427/249.1 |
| 7,846,591 B2 * | 12/2010 | Gu et al. ....................... 429/414 |
| 2002/0168466 A1 | 11/2002 | Tapphorn et al. |
| 2003/0124427 A1 | 7/2003 | Takeuchi et al. |
| 2003/0235711 A1 | 12/2003 | Seido et al. |
| 2004/0081881 A1 | 4/2004 | Vyas et al. |
| 2004/0086689 A1 | 5/2004 | Takahashi |
| 2004/0197661 A1 | 10/2004 | Utsunomiya et al. |
| 2005/0026020 A1 | 2/2005 | Franklin |
| 2005/0089742 A1 | 4/2005 | Ishigami et al. |
| 2005/0100771 A1 | 5/2005 | Vyas et al. |
| 2005/0158621 A1 | 7/2005 | Benoit et al. |
| 2005/0260473 A1 | 11/2005 | Wang |
| 2005/0266161 A1 | 12/2005 | Medeiros et al. |
| 2006/0001490 A1 | 1/2006 | Song |
| 2006/0003174 A1 | 1/2006 | Yashiki et al. |
| 2006/0019142 A1 | 1/2006 | Abd Elhamid et al. |
| 2006/0141340 A1 | 6/2006 | Takeuchi et al. |
| 2006/0222777 A1 | 10/2006 | Skoog et al. |
| 2007/0015034 A1 * | 1/2007 | Vyas et al. ...................... 429/34 |
| 2007/0138147 A1 | 6/2007 | Molz et al. |
| 2007/0160899 A1 | 7/2007 | Atanassova et al. |
| 2007/0231673 A1 | 10/2007 | Noh |
| 2008/0085439 A1 | 4/2008 | Hilliard |
| 2008/0134493 A1 | 6/2008 | Vyas et al. |
| 2008/0145633 A1 | 6/2008 | Kodas et al. |
| 2008/0220234 A1 | 9/2008 | Ko et al. |
| 2009/0176120 A1 | 7/2009 | Wang |
| 2010/0021634 A1 | 1/2010 | Kodas et al. |
| 2010/0133111 A1 | 6/2010 | Nocera et al. |
| 2010/0143781 A1 | 6/2010 | Keshavarz et al. |
| 2010/0151267 A1 | 6/2010 | Kodas et al. |
| 2010/0285386 A1 | 11/2010 | Wang |
| 2011/0076587 A1 | 3/2011 | Wang et al. |
| 2011/0091789 A1 | 4/2011 | Mofakhami et al. |
| 2012/0145532 A1 | 6/2012 | Smolyakov et al. |
| 2014/0242462 A1 | 8/2014 | Wang |

FOREIGN PATENT DOCUMENTS

| | | |
|---|---|---|
| EP | 1 369 504 | 12/2003 |
| EP | 1 808 920 | 7/2007 |
| EP | 1 847 628 | 10/2007 |
| JP | 2003-268567 | 9/2003 |
| JP | 2006-080083 | 3/2006 |
| KR | 10-2006-0106865 | 10/2006 |
| WO | WO 02/059936 | 8/2002 |
| WO | WO 2004/052559 | 6/2004 |
| WO | WO 2005/085490 | 9/2005 |
| WO | WO 2007/149881 | 12/2007 |
| WO | WO 2014/134019 | 9/2014 |

OTHER PUBLICATIONS

Toshiki Sato et al., "The Titanium Separator with Stable Durability and Low Electrical Resistance", Materials Research Laboratory, Kobelco Kobe Steel Group, 10 pages, Undated.
D.S.R. Krishna et al., "Effect of Thermal Oxidation Conditions on Tribological Behaviour of Titanium Films on 316L Stainless Steel", Science Direct Surface & Coating Technology, vol. 198, pp. 447-453 (2005).
J. Berghaus et al., "Suspension Plasma Spraying of Nanostructured WC-12Co Coatings", Journal of Thermal Spray Technology, vol. 15(4), pp. 676-681, Dec. 2006.
International Search Report issued in International Application No. PCT/US2009/030475, mailed Aug. 19, 2009.
Written Opinion issued in International Application No. PCT/US2009/030475, mailed Aug. 19, 2009.
International Preliminary Report on Patentability issued in International Application. No. PCT/US2009/030475, mailed Jul. 22, 2010.
Erich Lugscheider et al., "Reactive Plasma Spraying of Titanium", Advanced Engineering Materials, vol. 2, No. 5, pp. 281-284 (2000).
Supplementary European Search Report issued in EP 09 70 0943, mailed Jan. 25, 2011.
International Search Report issued in International Application No. PCT/US2010/050578, mailed Jun. 7, 2011.
Written Opinion issued in International Application No. PCT/US2010/050578, mailed Jun. 7, 2011.
English language abstract of KR 10-2006-0106865, published Oct. 12, 2006.
English language abstract of CH 533,691, published Feb. 15, 1973.
Machine English language translation of CH 533,691, published Feb. 15, 1973.
"Thermal Spraying: Practice, Theory, and Application", American Welding Society, pp. 3, 31, and 32 (1985).
Tzeng, et al. "Electrical Contacting Techniques for High TC Superconductor Applications", Superconductivity and Its Applications, 1998, pp. 174-179.
Chinese Office Action issued in CN 200980101881 dated Jun. 5, 2012.
Partial English language translation of Chinese Office Action issued in CN 200980101881 dated Jun. 5, 2012.
European Office Action issued in EP 09700943.5, dated Jun. 27, 2012.
Yamada, et al. "Nitridation of aluminum particles and formation process of aluminum nitride coatings by reactive RF plasma spraying," Thin Solid Films 515 (2007), pp. 4166-4171.
Bacci et al. "Reactive plasma spraying of titanium in nitrogen containing plasma gas", Materials Science and Engineering A283 (2000), pp. 189-195.
Chinese Office Action issued in CN 200980101881 dated Jan. 6, 2013.
Partial English language translation of Chinese Office Action issued in CN 200980101881 dated Jan. 6, 2013.
"Laser Plating and Melting for Hard metal Surfaces", IBM Technical Disclosure Bulletin, vol. 26, No. 7A, Dec. 1, 1983.
Chinese Office Action issued in CN 200980101881 dated Aug. 1, 2014.
Partial English language translation of Chinese Office Action issued in CN 200980101881 dated Aug. 1, 2014.
Korean Office Action issued in Korean Application No. 10-2010-7017499 dated Jan. 20, 2015.
English language translation of Korean Office Action issued in Korean Application No. 10-2010-7017499 dated Jan. 20, 2015.

(56) References Cited

OTHER PUBLICATIONS

English language abstract and translation of JP 2003-268567 published Sep. 25, 2003.
International Search Report issued in International Application No. PCT/US2014/033667 dated Oct. 8, 2014.
Written Opinion issued in International Application No. PCT/US2014/033667 dated Oct. 8, 2014.
U.S. Appl. No. 12/892,791.
P. Gougeon et al., "Simultaneous Independent Measurement of Splat Diameter and Cooling Time during Impact on a Substrate of Plasma-Sprayed Molybdenum Particles", Journal of Thermal Spray Technology, vol. 10, No. 1, pp. 76-82, Mar. 2001.
J.W. Luster et al., "Formation and Characterization of Corrosion Resistant Amorphous Coating by Thermal Spraying", In Surface Modification Technologies IX, pp. 479-493 (1996).
International Search Report issued in International Application No. PCT/US2014/018260 dated May 30, 2014.
Written Opinion issued in International Application No. PCT/US2014/018260 dated May 30, 2014.
L.C. Erickson et al., "Alumina Coatings by Plasma Spraying of Monosize Sapphire Particles", Journal of Thermal Spray Technology, vol. 8, No. 3, pp. 421-426. Sep. 1999.
U.S. Appl. No. 14/189,223.
Supplementary European Search Report issued in EP 14 75 6924 dated Jun. 29, 2016.
Machine English language abstract and translation of CN102074715 published Jul. 22, 2015.
Machine English language abstract and translation of JP2006080083 published Mar. 23, 2006.
Supplementary European Search Report issued in EP 14 78 3237 dated Jun. 16, 2016.
U.S. Appl. No. 12/350,896.

\* cited by examiner

CORROSION RESISTANT AND ELECTRICALLY CONDUCTIVE SURFACE OF METALLIC COMPONENTS FOR ELECTROLYZERS

CROSS REFERENCE TO RELATED APPLICATIONS

This application claims priority from U.S. Provisional Application Ser. No. 61/763,648 filed Feb. 12, 2013 and U.S. Provisional Application Ser. No. 61/776,189 filed Mar. 11, 2013 the entireties of which are incorporated herein by reference.

FIELD OF THE INVENTION

Embodiments of the invention relate to the enhancement of a metal surface's electrical conductivity and corrosion resistance for metallic components used in electrolyzers. More specifically, the embodiments relate to methods for improving the metal surface's electrical conductance and resistance to hydrogen embrittlement.

BACKGROUND

An electrolyzer is an electrochemical device that can split water into hydrogen and oxygen using electrical power. The typical structure of an electrolyzer cell includes the membrane-electrode-assembly (MEA) for the electrochemical reactions, gas diffusion layers (GDL) to transport oxygen and hydrogen away from the electrode, and additional necessary hardware. A practical electrolyzer includes multiple cells for sufficient hydrogen or oxygen production capability. These cells are connected in series using bipolar separate plates to build a stack with other necessary hardware such as e.g., end plates, cell frame, gaskets, etc. One side of the separate plate faces the hydrogen chamber of one cell, and the other side of the plate faces the oxygen chamber of the adjacent cell (i.e., the plate is bipolar). Depending on the system configuration, large electrolyzer systems could include multiple stacks for high capacity.

Due to the difference in the working conditions in oxygen and hydrogen chambers, the requirements for the GDL and separate plates are different. The common requirement for these components is that they must be electrically conductive. In the oxygen chamber, the GDL and separate plate must have superior resistance to electrochemical corrosion at high electrochemical potentials, typically >1.5 $V_{SHE}$. On the other hand, in the hydrogen chamber, the GDL and separate plate must have excellent resistance to hydrogen embrittlement, especially for high pressure electrolyzers. The electrochemical corrosion will result in a thick oxide layer on the surface that has high electrical resistance, and reduce the energy efficiency of the electrolyzer. The hydrogen embrittlement will affect the mechanical properties of the plate, resulting the mechanical failure of the stack.

In order to meet these performance requirements, the regular electrolyzer uses two pieces of metal plates to form the bipolar plate. On the oxygen side, a platinum plated titanium plate is used for the high electrochemical potential corrosion resistance. On the hydrogen side, a zirconium plate is used to prevent hydrogen embrittlement. A platinum-plated titanium mesh, screen or porous plate is typically used as the GDL in the oxygen chamber. These components are very expensive.

Therefore, it is desired to use low cost materials to reduce the electrolyzer's cost. Moreover, and specific to the bipolar plates, a one-piece metal plate is resistant to both high electrochemical potential corrosion and hydrogen embrittlement is desired to simplify the stack structure and reduce costs.

DETAILED DESCRIPTION

Figure 1A:
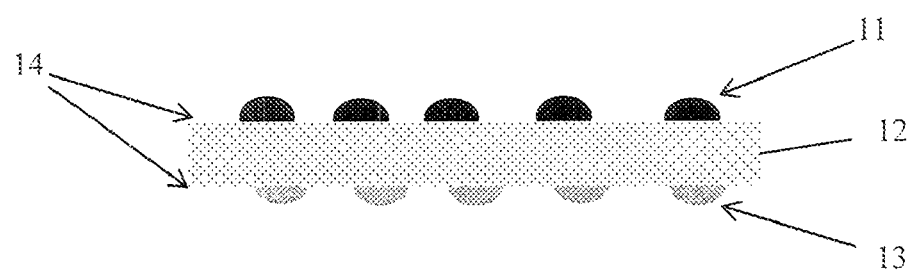
FIG. 1A is a schematic drawing of a bipolar plate having precious metals on both sides of the plate, in accordance with an embodiment disclosed herein.

In the following detailed description, a plurality of specific details, such as types of materials and dimensions, are set forth in order to provide a thorough understanding of the preferred embodiments discussed below. The details discussed in connection with the preferred embodiments should not be understood to limit the present inventions. Furthermore, for ease of understanding, certain method steps are delineated as separate steps; however, these steps should not be construed as necessarily distinct nor order dependent in their performance.

An object of the embodiments disclosed herein is to provide a metal surface structure and treatment process to prevent the corrosion (i.e., both high electrochemical potential oxidization and hydrogen embrittlement) of a metallic component used in electrolyzer operational conditions. The oxide surface scale of a metal plate is used to prevent the corrosion, and electrical conductive materials such as e.g., precious metals or carbon, are used to provide the surface electrical conductance of the metallic components.

An advantage of the disclosed methods is that they can produce, at a low cost, metal components for electrolyzers that need high electrical conductance and corrosion resistance for long term operation.

A method of using the combination of a thick surface oxide layer of metal and electrically conductive and chemically inert coating materials to protect the metallic components in electrolyzers is provided. The combination of these two materials will eliminate the need for perfect, defect-free electrically conductive coating for the metal corrosion protection.

The base metallic material could be titanium (Ti), niobium (Nb), tantalum (Ta), stainless steel, and nickel. Titanium is the preferred material in most applications.

The electrically conductive and chemically inert (corrosion resistant) material could be precious metals and carbon. Platinum (Pt) is the preferred material used in components for the oxygen chamber. Carbon gold (Au) and ruthenium (Ru) are preferred materials for the components in the hydrogen chamber. It should be appreciated, however, that any precious metal such as e.g., silver (Ag), ruthenium (Ru) or Indium (IR) could be used in the components of the chambers. Any conventional deposition process could be used for the deposition of these materials on the substrate surface. For precious metals, a thermal spray technique is the preferred process. For carbon, physical vapor deposition (PVD) is the preferred process.

The surface coverage of the conductive material on the substrate is in the range of 0.5-99.9%. In the case of precious metals, the coverage is as low as possible to reduce cost. The preferred coverage is below 50% or 20%. In the case of using carbon for the hydrogen chamber, the coverage can be close to 100% (with the exception being the unavoidable defects). In an embodiment, the thickness range of the oxide layer is 1 nm-1,000 nm, the preferred range is between 10 nm to 100 nm.

The conductive materials can be in the form of isolated islands, connected spots, or the whole surface coating, as desired.

The thick oxide layer is grown on the metal plate surface (that has a native thin oxide layer) after the conductive material is deposited. The oxide layer can be grown by anodizing, thermal oxidization, plasma oxidization, or any other similar oxidization method. The preferred process is thermal oxidization in air or a controlled atmosphere. This oxide layer should enhance the electrochemical oxidization resistance of the metallic components in the oxygen chamber, and block the hydrogen absorption in the hydrogen chamber. When a thermal spray process is used for the deposition of the conductive materials, the thick oxide layer can be grown at the same time. Alternatively, the oxide layer on the metal substrate surface can be grown by storing the metal substrate in oxygen or a water containing environment for a sufficiently long time period.

In the case of a GDL for the oxygen chamber, a metal mesh, metal screen or porous plate is deposited with small amounts of precious metal that cover a small portion of the outer surface. The oxide layer can be grown on the rest of the surface by thermal oxidization before it is assembled into the electrolyzer, or by anodizing inside of the electrolyzer without further treatment.

In the case of a bipolar plate, the conductive material used on the oxygen side and the hydrogen side could be different. In one example, the thick oxide layer is grown on the hydrogen side before the bipolar plate is assembled into an electrolyzer stack. In another example, the oxide layer can be grown after the stack is assembled and stored for a sufficiently long time period, by having the plates in contact with oxygen or water in the stack.

Figure 1B:
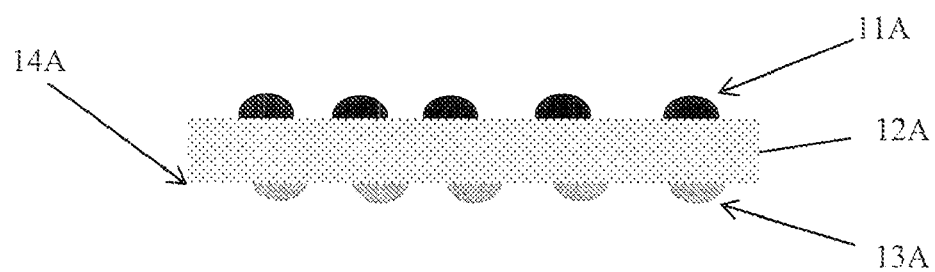
FIG. 1B is a schematic drawing of a bipolar plate having precious metals on both sides of the plate and an oxide layer only on one side of the plate, in accordance with an embodiment disclosed herein.

In one embodiment suitable for metal bipolar plates, as shown in FIG. 1A, isolated platinum islands 11 are deposited on one side of a metal plate's 12 surface, and isolated gold 13 islands are deposited on the other side of the metal plate's 12 surface. Then, a thick oxide layer 14 is formed on the plate surface (except the areas covered by the gold and platinum islands). The plate side with the platinum islands 11 is used for the oxygen chamber, and the other side with the gold islands 13 is used for the hydrogen chamber. The thick surface oxide layer 14 is used to prevent the hydrogen absorption to the metal plate 12. A variation of this embodiment is shown in FIG. 1B. The thick oxide layer 14A is only grown on the side of the metal plate 12A having the gold dots 13A, which is used in the hydrogen chamber. The platinum 11A are same as the platinum islands 11 shown in FIG. 1A.

Figure 2A:
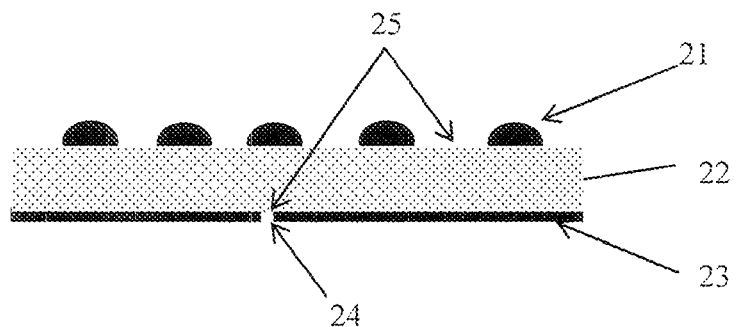
FIG. 2A is a schematic drawing of a bipolar plate having a precious metal on one side and carbon on the other side of the plate, in accordance with an embodiment disclosed herein.
Figure 2B:
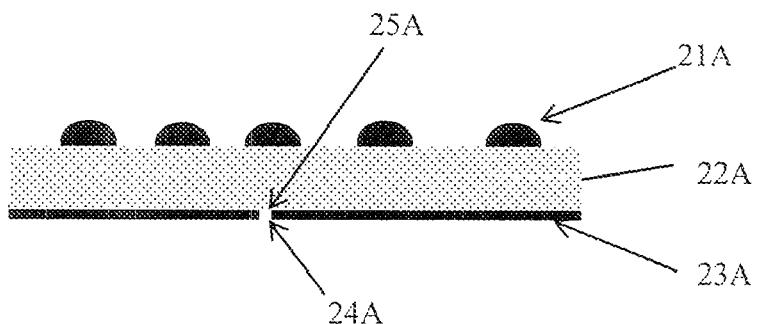
FIG. 2B is a schematic drawing of a bipolar plate having precious metal on one side and carbon on the other side of the plate, and an oxide layer only on the carbon side of the plate, in accordance with an embodiment disclosed herein.

In another embodiment suitable for metal bipolar plates, as shown in FIG. 2A, isolated platinum islands 21 are deposited on one side of a metal plate 22's surface, and a carbon layer 23 is deposited on the other side of the metal plate 22. From a practical point of view, the carbon coating will have some defects 24, such as pin-holes and microcracks. The portions of the metal plate 22 surface under these defects 24 will not be covered by carbon 23. Therefore, a thick oxide 25 layer is grown in the defect 24 areas and the areas on the other side of the metal plate 22 that are not covered by platinum dots 21 to protect the metal plate 22. The plate side with the platinum islands 21 is used for the oxygen chamber, and the other side with the carbon coating 23 is used for the hydrogen chamber. The carbon layer 23 and the thick oxide layer 25 together completely cover the metal surface in the hydrogen chamber to prevent hydrogen absorption into the metal plate 22. A variation of this embodiment is shown in FIG. 2B. The thick oxide layer 25A is only grown on the carbon layer defects 24A, on the carbon coated side of metal plate 22A, which is used in the hydrogen chamber. The platinum islands 21A are same as the platinum islands 21 shown in FIG. 2A.

Figure 3:
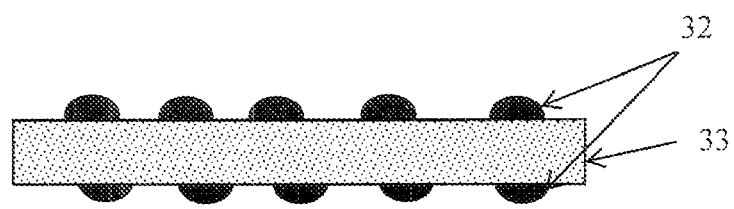
FIG. 3 is a schematic drawing of a oxygen gas diffusion layer having precious metal islands on the outer surface of a metal plate, in accordance with an embodiment disclosed herein.

A further embodiment suitable for a gas diffusion layer used in the oxygen chamber is shown in FIG. 3. A metal screen or porous metal plate 33 is used as the substrate material and isolated platinum islands 32 are deposited on the outer surfaces of the substrate 33. The platinum islands 32 will be used as the electrical contact points of the GDL to transport electrons between the electrode and the bipolar plates when used in an electrolyzer.

Figure 4:
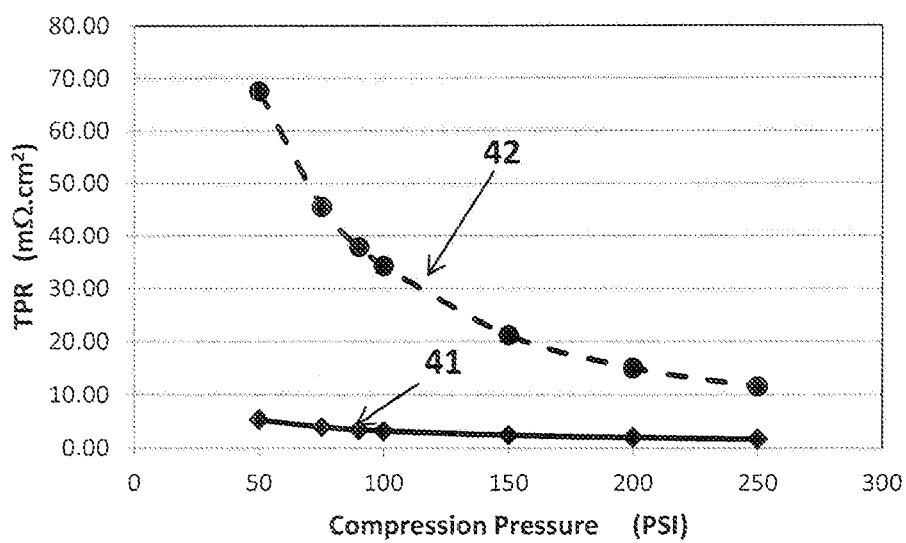
FIG. 4 is a graph illustrating a compression of the through plate resistance (TPR) a plain titanium bipolar plate, and titanium bipolar plate having platinum (Pt) islands on one side and gold (Au) island on the other side of the plate.
Figure 5A:
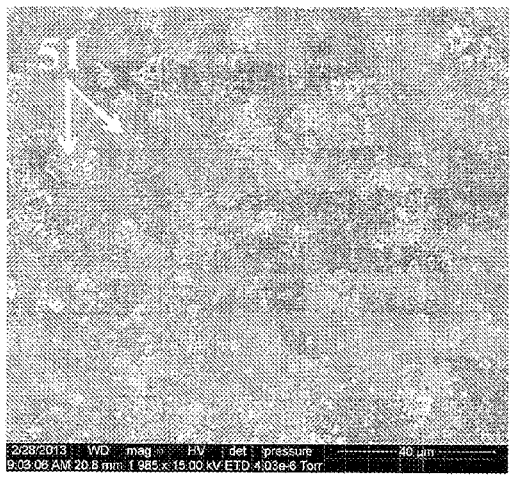
FIGS. 5A-5B are Scanning Electron Microscopy (SEM) images of gold (Au) and platinum (Pt) dots on a titanium (Ti) substrate surface, in accordance with an embodiment disclosed herein.
Figure 5B:
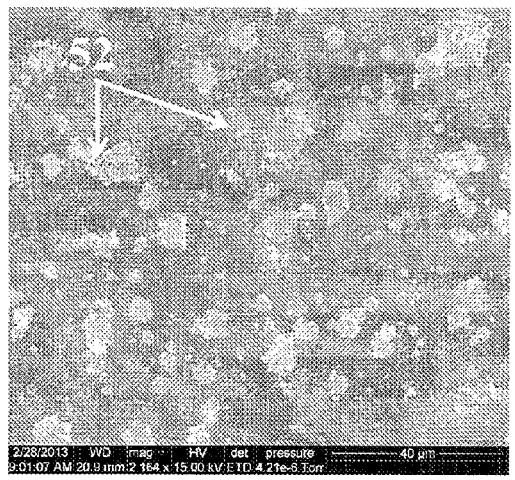

In one example application in accordance with the disclosed principles, a dense, 0.1 mm thick titanium plate is used as the substrate material for a bipolar plate. Platinum particles are thermally sprayed on one side of the plate's surface, and gold particles are sprayed on the other side of the plate's surface. Both platinum and gold covers approximately 10% of the plate's surface in the form of small islands/dots. Then, the plate is heat treated in air to grow the oxide layer. One way to measure the viability of this application is to measure its electrical through plate resistance (TPR). The electrical through plate resistance (TPR) is measured by sandwiching a titanium plate between two porous carbon papers (TGP-H-060 Toray Paper) under the compression pressure between 50 to 250 psi, which is graphically shown in FIG. 4. Curve 41 is the TPR of a titanium (Ti) plate with platinum (Pt) and gold (Au) islands, as disclosed herein. Curve 42 is the TPR of a titanium (Ti) plate without the platinum (Pt) and gold (Au) islands. The comparison of FIG. 4 shows that the platinum and gold islands effectively reduce the TPR of the titanium plate. The Scanning Electron Microscopy (SEM) images of the gold (Au) 51 and platinum (Pt) 52 islands/dots on a titanium (Ti) plate are respectively shown in FIGS. 5A and 5B.

As noted above, the disclosed embodiments will be resistance to hydrogen embrittlement. This hydrogen embrittlement resistance is proven in the following experiment. A commercial pure titanium plate is used as the substrates for the experiment. Some plates are deposited with platinum (Pt) islands, and some plates are deposited with gold (Au) islands, by a thermal spray process. After the platinum or gold depositions, the plates are oxidized in air at a high temperature. The hydrogen embrittlement experiment is then carried out by putting the plates with platinum or gold islands in a hydrogen atmosphere at 760 psi and holding it at approximately 100° C. for 1000 hours. Then, the hydrogen content in the plates is analyzed by chemical elemental analysis. It is found that the hydrogen concentration in the plates with gold islands is 73 parts per million (ppm), which is about the same concentration as the original material before the high pressure hydrogen test. On the other hand, the hydrogen concentration in the plates with platinum islands increases to 720 ppm under the same conditions. This experiment shows that using gold islands and titanium oxide surface layer can avoid hydrogen embrittlement corrosion for the metal plates in the hydrogen chamber of electrolyzers.

In another application in accordance with the disclosed principles, a dense titanium plate is used as the substrate material for a bipolar plate. Platinum is used on the oxygen side, and carbon is used on the hydrogen side. After both platinum and carbon are deposited on the titanium plate's surface, the titanium plate is heat treated in argon with a trace amount of oxygen to grow the thick oxide layer to cover the titanium surface that is exposed by the defects of the carbon coating. The trace amount of oxygen in argon cannot oxidize carbon, but it can oxidize the titanium due to the reaction free energy difference between carbon and titanium reactions with oxygen. The carbon and titanium oxide layer together can completely cover the titanium substrate to protect it from hydrogen embrittlement.

Figure 6A:
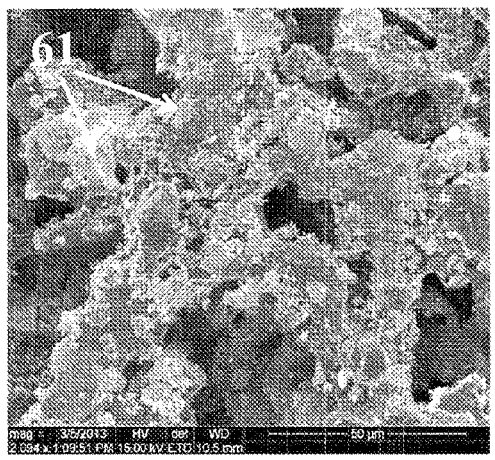
FIGS. 6A-6B are SEM images of platinum (Pt) dots on a porous titanium (Ti) substrate, in accordance with an embodiment disclosed herein.
Figure 6B:
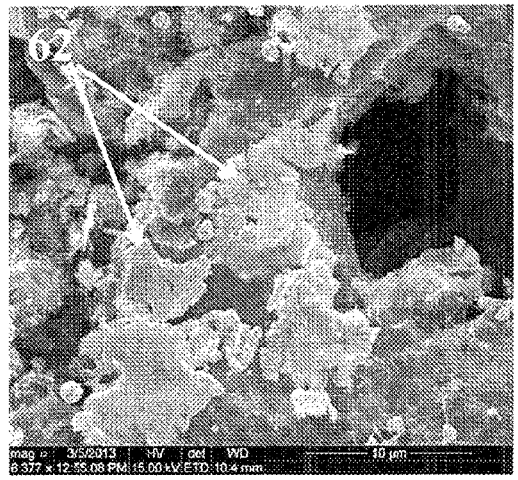

As mentioned above, a porous titanium plate is used as the substrate for the GDL for the oxygen chamber. The pore size of the plate is determined by the operational pressure of the electrolyzer. Platinum is deposited on the plate's outer surface. The coverage of the platinum on the titanium's outer surface is e.g., 10-20%. SEM images of the platinum dots 61, 62 on the porous titanium are shown in FIGS. 6A-6B.

Figure 7:
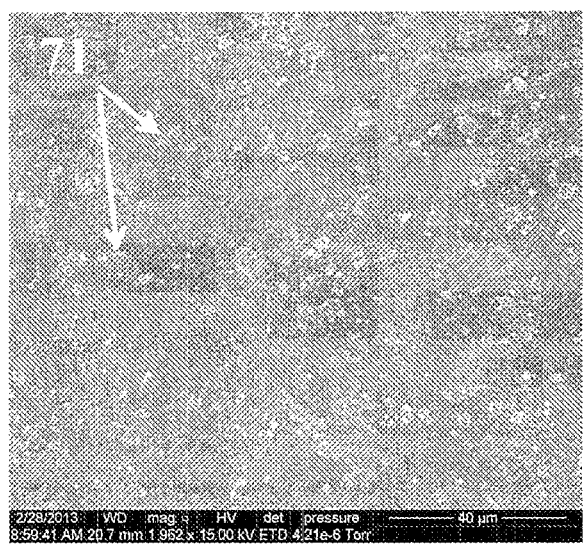
FIG. 7 is a SEM image of ruthenium (Ru) dots on a titanium (Ti) substrate, in accordance with an embodiment disclosed herein.

In another application in accordance with the disclosed principles, a dense, 0.1 mm thick titanium plate is used as the substrate material for a bipolar plate. Platinum particles are thermally sprayed on one side of the plate surface, and ruthenium (Ru) particles are sprayed on the other side of the plate surface. Both platinum (Pt) and ruthenium (Ru) on the plate's surfaces are in the form of small islands. Then the plate is heat treated in air to grow the oxide layer. A SEM image of the ruthenium (Ru) 71 islands on the titanium (Ti) plate is shown in FIG. 7.

Figure 8:
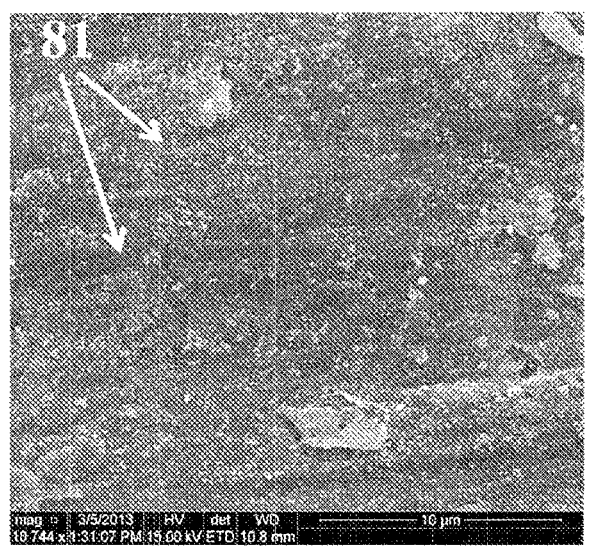
FIG. 8 is a SEM image of silver (Ag) dots on a titanium (Ti) substrate, in accordance with an embodiment disclosed herein.

In another application in accordance with the disclosed principles, a dense, 0.1 mm thick titanium plate is used as the substrate material for a bipolar plate. Platinum particles are thermally sprayed on one side of the plate's surface, and a silver nitrite solution is thermally sprayed on the other side of the plate's surface. Silver nitrite will decompose to silver metal in the high temperature flame and deposit on the plate surface as silver metal particles. Both platinum and silver on the plate surface will be in the form of small islands. Then, the plate is heat treated in air to grow the oxide layer. A SEM image of the silver (Ag) 81 on the titanium (Ti) plate is shown in FIG. 8.

Figure 9:
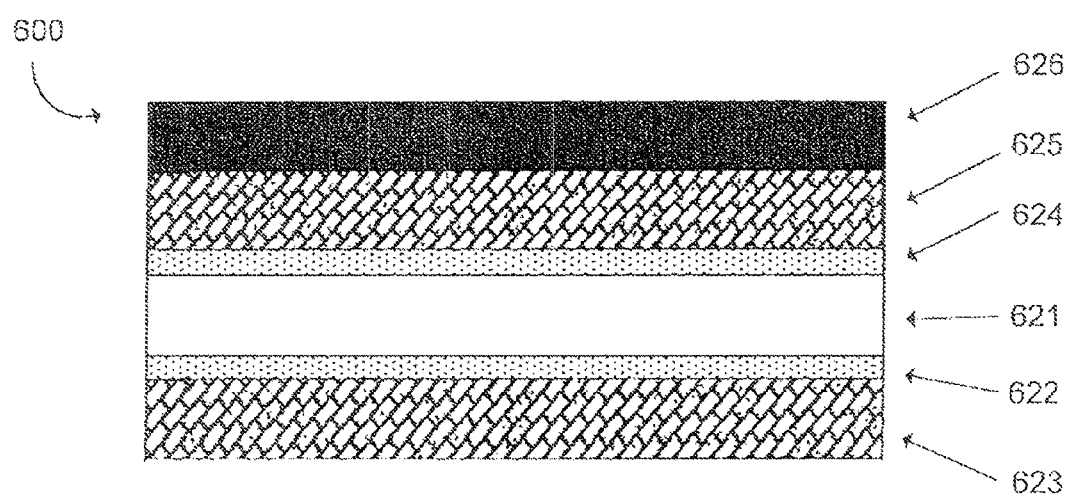
FIG. 9 is an example electrolyzer cell in which embodiments disclosed herein can be utilized.

As mentioned above, the disclosed treated metal substrates could be used as a single piece bipolar plate and/or an oxygen gas diffusion layer in an electrolyzer cell, an example of which is shown in FIG. 9. FIG. 9 illustrates a simplified schematic diagram of a Proton Exchange Membrane (PEM) or an Alkaline Exchange Membrane (AEM) electrolyzes cell module, simply referred to as an electrolyzer cell module 600 hereinafter. The electrolyzer stack is constructed with a lumber of repeat cell modules 600, which includes an electrolyte 621, a cathode catalyst 622 for hydrogen generation, hydrogen gas diffusion layer 623, an anode catalyst 624 for oxygen generation, oxygen gas diffusion layer 625, and bipolar separate plate 626, the operation of which is well known in the art.

As mentioned above, it should be appreciated that embodiments disclosed herein are not limited to the specific features discussed above. For example, the growing conditions listed herein are mere examples and it should be appreciated that the growing can occur before the substrate is placed within the device or after. The exact process used (i.e., thermal oxidation, anodizing, plasma oxidation) will depend on the type of application or processing costs.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to an functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. An electrochemical device comprising:
   a metal component comprising a metal substrate, said metal substrate having first and second surfaces;
   a plurality of first precious metal islands deposited on a native surface oxide layer of the first surface of the metal substrate and being adapted to be in contact with hydrogen, said first precious metal islands comprising a first precious metal;
   a plurality of second precious metal islands deposited on a native surface oxide layer of the second surface of the metal substrate, said second precious metal islands comprising a second precious metal that is different from said first precious metal; and
   a grown oxide layer on the first surface in areas that are not covered by said first precious metal, said grown oxide layer being grown on top of an original surface oxide scale of the metal component after the first precious metal islands are deposited on the first surface of the metal substrate,
   wherein a surface coverage of said first precious metal islands is less than 50% of the first surface of the metal surface, and the first precious metal and grown oxide layer provide a resistance to hydrogen embrittlement for the metal component.

2. The device of claim 1, further comprising a grown oxide on the second surface of the metal substrate in areas that are not covered by said second precious metal.

3. The device of claim 2, wherein the metal substrate comprises one of titanium, niobium, tantalum, stainless steel, and nickel.

4. The device of claim 1, wherein said first precious metal is gold and said second precious metal is platinum.

5. The device of claim 4, wherein said grown oxide is on the first surface of the substrate in areas that are not covered by gold.

6. The device of claim 4, wherein said grown oxide is on the first surface of the substrate in areas that are not covered by gold and on the second surface in areas not covered by platinum.

7. The device of claim 1, wherein said first precious metal is ruthenium and said second precious metal is platinum.

8. The device of claim 1, wherein said first precious metal is silver and said second precious metal is platinum.

9. The device of claim 7, further comprising a grown oxide on the first surface in areas that are not covered by ruthenium and on the second surface in areas not covered by platinum.

10. The device of claim 8, further comprising a grown oxide on the first surface in areas that are not covered by silver and on the second surface in areas not covered by platinum.

11. The device of claim 1, wherein said grown oxide on the metal substrate prevents hydrogen absorption into the metal component when the electromechanical device is in use.

* * * * *